(12) United States Patent
Zondervan et al.

(10) Patent No.: US 10,019,501 B2
(45) Date of Patent: Jul. 10, 2018

(54) DATA STORE SYNCHRONIZATION UTILIZING SYNCHRONIZATION LOGS

(75) Inventors: Quinton Y. Zondervan, Cambridge, MA (US); Revathi Subramanian, White Plains, NY (US); Chuang Chun Liu, San Jose, CA (US); Fenil Shah, Montvalue, NJ (US); Maria M. Corbett, Lexington, MA (US); Sesha S. Baratham, Action, MA (US); Stephen T. Auriemma, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 11/612,317

(22) Filed: Dec. 18, 2006

(65) Prior Publication Data
US 2008/0147750 A1 Jun. 19, 2008

(51) Int. Cl.
*G06F 17/30* (2006.01)

(52) U.S. Cl.
CPC .............. *G06F 17/30581* (2013.01)

(58) Field of Classification Search
None
See application file for complete search history.

(56) References Cited

U.S. PATENT DOCUMENTS

| | | | |
|---|---|---|---|
| 6,098,078 A * | 8/2000 | Gehani et al. | 707/610 |
| 6,226,650 B1 * | 5/2001 | Mahajan et al. | 707/625 |
| 6,477,703 B1 * | 11/2002 | Smith et al. | 717/168 |
| 6,836,825 B2 * | 12/2004 | Goff | 711/118 |
| 7,024,430 B1 * | 4/2006 | Ingraham et al. | 707/201 |
| 2002/0116405 A1 * | 8/2002 | Bodnar et al. | 707/202 |
| 2004/0003266 A1 * | 1/2004 | Moshir et al. | 713/191 |
| 2004/0139468 A1 * | 7/2004 | Kidd | 725/86 |
| 2005/0071194 A1 * | 3/2005 | Bormann et al. | 705/2 |
| 2005/0198084 A1 | 9/2005 | Kim | |
| 2006/0075001 A1 * | 4/2006 | Canning | G06F 8/65 |
| 2006/0130037 A1 * | 6/2006 | MacKay | 717/168 |

(Continued)

OTHER PUBLICATIONS

Panagos, E., et al; Synchronization and Recovery in a Client-Server Storage System; VLDB JoUrnal; 1997.

(Continued)

*Primary Examiner* — Charles D Adams
(74) *Attorney, Agent, or Firm* — Steven M. Greenberg, Esq.; CRGO Law

(57) ABSTRACT

Embodiments of the present invention address deficiencies of the art in respect to data synchronization and provide a novel and non-obvious method, system and computer program product for synchronization log driven data synchronization. In one embodiment of the invention, a data synchronization method can be provided to include assembling a group of initial updates for synchronization, consulting a synchronization log of updates excluded from past synchronizations to determine updates already applied during past synchronizations, removing updates already applied during past synchronizations from a filtered set of updates, and synchronizing the filtered set of updates. In this regard, assembling a group of initial updates for synchronization can include assembling a group of initial updates having a timestamp greater than a timestamp for an immediate past synchronization.

9 Claims, 2 Drawing Sheets

(56) References Cited

U.S. PATENT DOCUMENTS

2006/0288341 A1* 12/2006 Wurden et al. ............... 717/168
2007/0271317 A1* 11/2007 Carmel ......................... 707/204

OTHER PUBLICATIONS

Jing, Jin; Client-Server Computing in Mobile Environments; ACM Computing Surveys, vol. 3 1, No. 2, Jun. 1999.
Amsaleg, Laurent, et al; Garbage Collection for a Client-Server Persistent Object Store; ACM Transactions on Computer Systems, vol. 17, No. 3. Aug. 1999, pp. 153-201.

* cited by examiner

DATA STORE SYNCHRONIZATION UTILIZING SYNCHRONIZATION LOGS

BACKGROUND OF THE INVENTION

Field of the Invention

The present invention relates to the field of data synchronization and more particularly to the data store synchronization optimization.

Description of the Related Art

Personal computers no longer are the most common vehicle through which users connect to data communications networks like the Internet. Now that computing can be viewed as being truly everywhere, computer scientists and information technologists have begun to rethink those services that can be provided to meet the needs of mobile computing users. In consequence, the study of pervasive computing has resulted in substantial innovation in the field of network connectivity. "Pervasive computing" has been defined as referring to any non-constrained computing device not physically tethered to a data communications network. Thus, pervasive computing devices refer not only to computers wirelessly linked to networks, but also to handheld computing devices, wearable systems, embedded computing systems and the like.

Most pervasive devices, including notebook computers, handheld computers and even data enabled cellular telephones permit data synchronization with a different computing device, for example a desktop computer. Data synchronization refers to the harmonization of data between two data sources such that the data contained in each data source can be reconciled notwithstanding changes to the data applied in either or both of the data sources. Modern pervasive devices provide for a synchronization process through a direct cable link, a modem link, or a network link to a host computing device. Wireless pervasive devices further can accommodate synchronization over infrared or radio frequency links.

Peer-to-peer synchronization refers to the synchronization not only between different pervasive devices and server data sources, but also between the different pervasive devices themselves. In peer-to-peer synchronization, individual peers can provide updates to a common server data source already known by other peers coupled to the common server data source. Consequently, during subsequent synchronization with the other peers, redundant attempts to apply the known updates will arise. Of course, conflict management during the synchronization process will avoid the introduction of duplicate data, but the process of redundantly applying updates can consume valuable computing resources unnecessarily.

Excessive and unnecessary consumption of computing resources also arises in the context of filtered synchronization. In filtered synchronization, updates can be filtered according to specified filtering criteria. As a result, only a subset of available updates will be pushed to the pervasive device. When the filtering criteria changes, however, it is no longer readily recognizable whether an update had previously been applied to the pervasive device. As a remedy, some synchronization schemes implement an id-list sync algorithm in which a representation of the entire state of the pervasive device is provided to the server, again consuming greater resources than desired.

BRIEF SUMMARY OF THE INVENTION

Embodiments of the present invention address deficiencies of the art in respect to data synchronization and provide a novel and non-obvious method, system and computer program product for synchronization log driven data synchronization. In one embodiment of the invention, a data synchronization method can be provided to include assembling a group of initial updates for synchronization, consulting a synchronization log of updates excluded from past synchronizations to determine updates already applied during past synchronizations, removing updates already applied during past synchronizations from a filtered set of updates, and synchronizing the filtered set of updates. In this regard, assembling a group of initial updates for synchronization can include assembling a group of initial updates having a timestamp greater than a timestamp for an immediate past synchronization.

In one aspect of the embodiment, consulting a synchronization log of updates excluded from past synchronizations to determine updates already applied during past synchronizations can include applying a synchronization filter to a difference log to identify previously unapplied updates meeting a filtering criteria. Consequently, the identified previously unapplied updates can be removed from the difference log while presently excluded ones of the group of updates can be added to the difference log. Optionally, aged entries in the difference log can be garbage collected to avoid an excessively large difference log.

In another aspect of the embodiment, consulting a synchronization log of updates excluded from past synchronizations to determine updates already applied during past synchronizations can include receiving a peer synchronization log from a synchronization client, and consulting the peer synchronization log to identify updates in the synchronization client received from peer synchronization clients. Consequently, removing updates already applied during past synchronizations from a filtered set of updates further can include removing from the filtered set of updates identified updates known to have been received from peer synchronization clients.

In yet another aspect of the embodiment, consulting a synchronization log of updates excluded from past synchronizations to determine updates already applied during past synchronizations can include receiving a replica table from within a peer synchronization log from a synchronization client, and consulting the replica table to identify updates in the synchronization client received from peer synchronization clients that had not been updated since an immediate past synchronization. In this aspect of the embodiment, removing updates already applied during past synchronizations from a filtered set of updates further can include removing from the filtered set of updates identified updates known to have been received from peer synchronization clients that had not been updated since an immediate past synchronization.

Other embodiments of the invention can include a peer-to-peer synchronization data processing system. The system can include a synchronization server configured for coupling to a plurality of synchronization clients configured for peer-to-peer synchronization. The server further can include synchronization log based synchronization logic. The logic can include program code enabled to track within the synchronization server updates previously applied to a selected one of the synchronization clients, to exclude from a filtered set of updates any updates already applied during past synchronizations with the selected one of the synchronization clients, and to synchronize the filtered set of updates with the selected synchronization client.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for synchronization log driven data synchronization. In accordance with an embodiment of the present invention, a synchronization log can be maintained for past synchronizations with a data source. The synchronization log can include, for example, a difference log of filtered updates, or a peer synchronization log of updates received from other peers. During synchronization, the synchronization log can be consulted to further modify the list of updates applied during synchronization. For instance, in the case of the difference log, a current filter can be applied to the difference log to avoid redundant updates. Likewise, in the case of a peer synchronization log, updates during synchronization that appear in the peer synchronization log can be omitted from application during synchronization.

Figure 1:
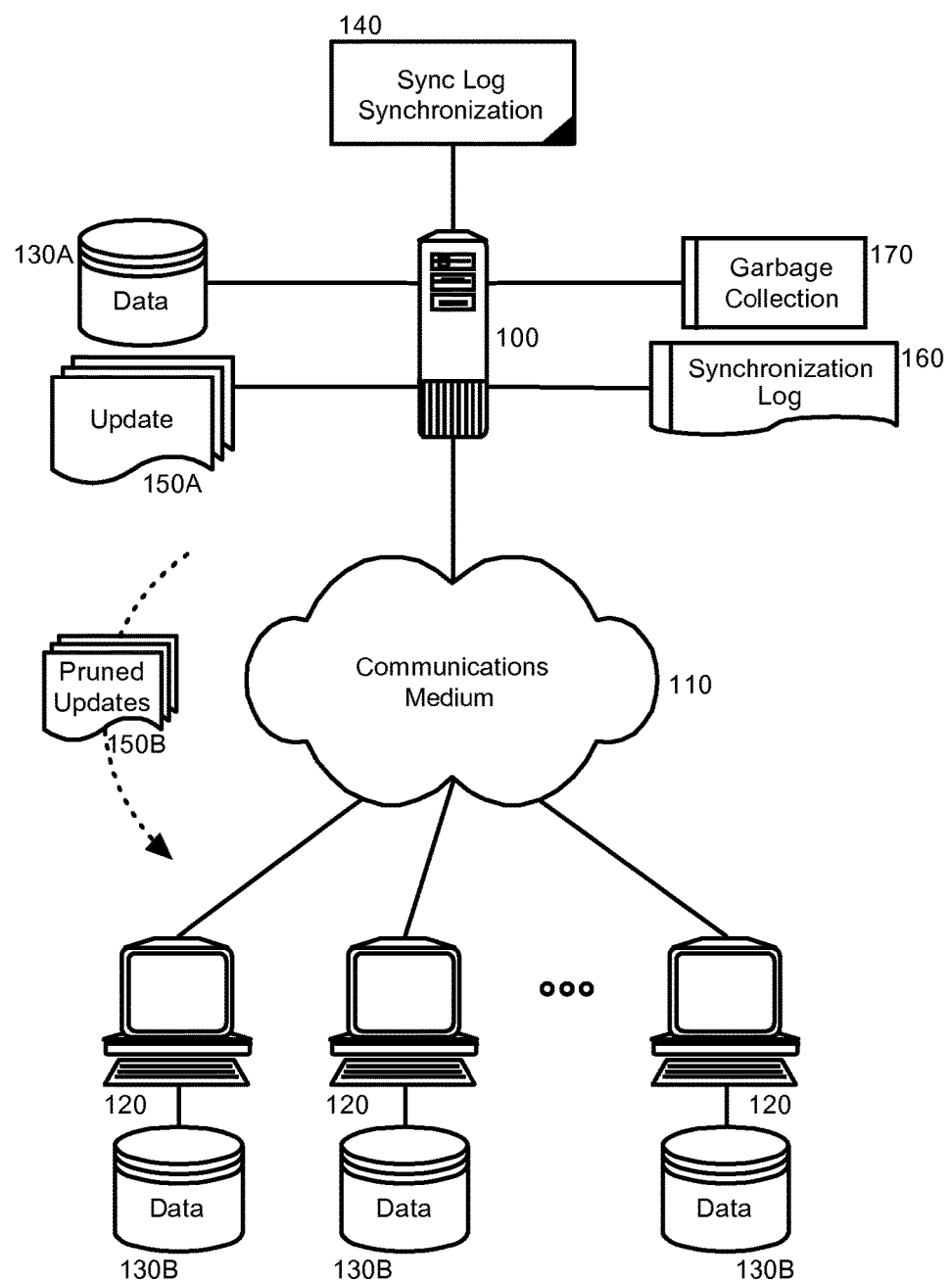
FIG. 1 is a schematic illustration of a data synchronization data processing system configured for synchronization log driven data synchronization.

In further illustration, FIG. 1 is a schematic illustration of a data synchronization data processing system configured for synchronization log driven data synchronization. The system can include a data server 100 coupled to one or more clients 120 such as pervasive devices. The data server 100 can be coupled to the clients 120 over a communications medium 110 such as a wireless direct link, a cable bound direct link, a network communications link, and the like. The data server 100 can include a data store of synchronized data 130A. Likewise, the clients 120 can include respective data stores of synchronized data 130B.

Synchronization log synchronization logic 140 can be coupled to the data server 100. The logic 140 can include program enabled to synchronize updates 150A to the data store of synchronized data 130A with the data stores of synchronized data 130B for the coupled clients 120. The logic 140 further can include program code enabled to prune the updates 150A into pruned updates 150B according to a synchronization log 160. The synchronization log 160, itself, periodically can be size limited according to the operation of a coupled garbage collector 170.

As an example, the synchronization log 160 can include a difference log of previously omitted updates such that modifications to a synchronization filter during synchronization will not result in redundant updates. As another example, the synchronization log 160 can include a peer synchronization log of updates provided by peers synchronizing with one of the clients 120. During synchronization, updates provided by the peers can be expressly excluded from the updates applied during synchronization. Updates received from a peer that are not reflected in the data store of synchronized data 130A, however can be included during synchronization.

Figure 2:
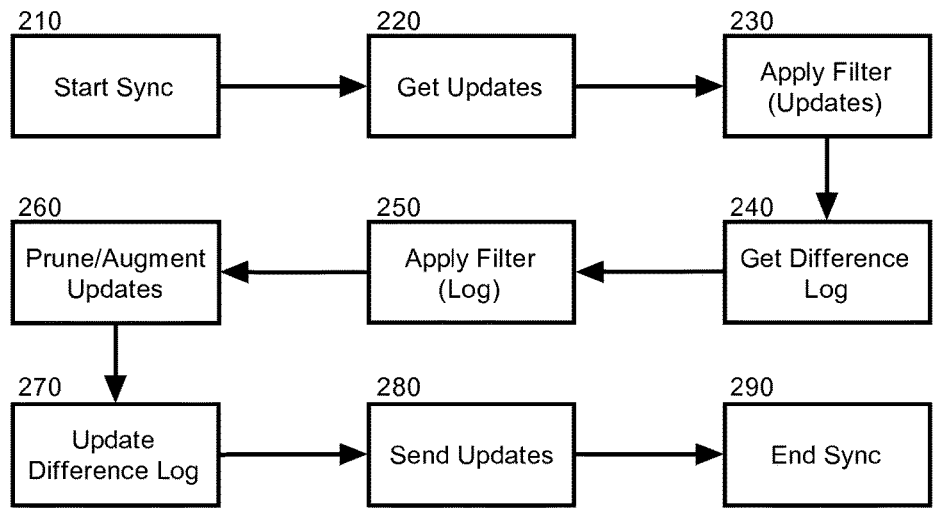
FIG. 2 is a flow chart illustrating a process for difference log driven data synchronization; and, FIG. 3 is a flow chart illustrating a process for peer synchronization log driven data synchronization.

FIG. 2 is a flow chart illustrating a process for difference log driven data synchronization. The process can begin in block 210 at the start of a synchronization operation with a specified client. In block 220, an initial set of updates can be computed based upon data that has been changed, data that has been added, and data that has been deleted since the conclusion of the immediate past synchronization operation. In block 230, the initial set of updates can be filtered according to a synchronization filter. Notably, in block 240 a difference log can be retrieved including a listing of updates that had been previously filtered out of an initial set of updates according to a synchronization filter.

In block 250, the synchronization filter for the current synchronization operation can be applied to the difference log to produce a filtered set of updates that had not been previously applied to the client. Thereafter, the updates can be pruned to include only those updates not previously sent during prior synchronization operations and the filtered set of updates can be added to the pruned set updates. In block 270, the set of initial updates omitted due to the filter can be added to the difference log and those entries in the difference log added to the pruned set of updates can be removed from the difference log. Finally, as illustrated in block 280, the pruned set of updates can be forwarded to the client and the process can end in block 290.

Figure 3:
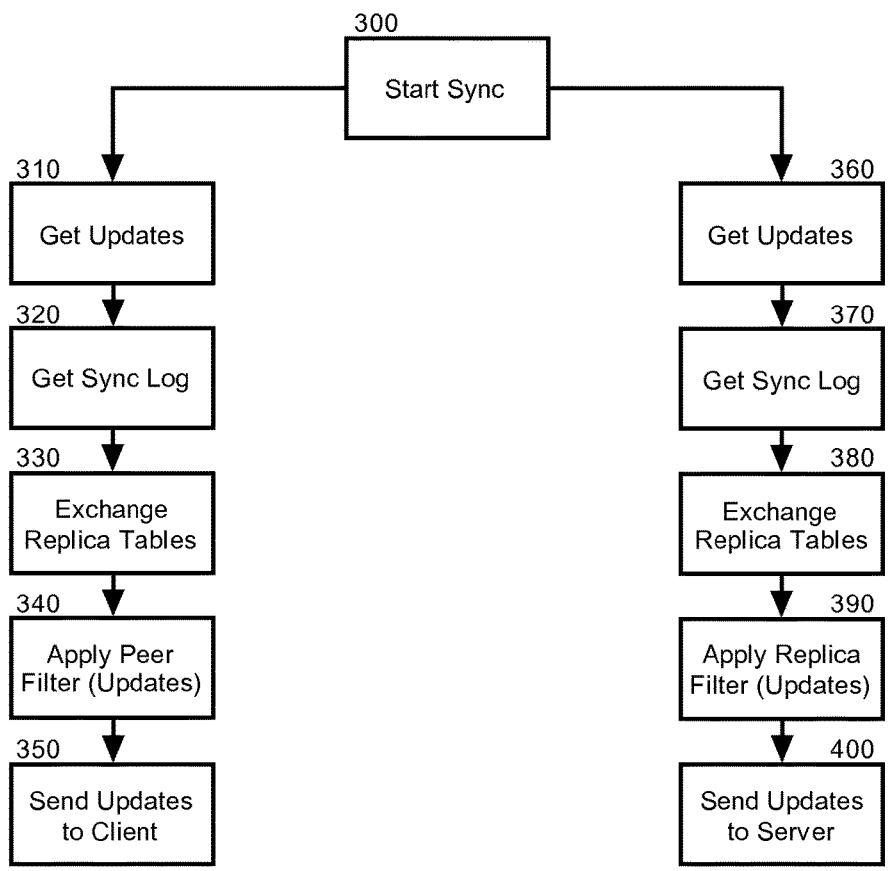

The synchronization log can be consulted not only to identify already applied updates to a client, but also to identify updates applied by peer clients. In illustration, FIG. 3 is a flow chart illustrating a process for peer synchronization log driven data synchronization. Beginning in block 300, the synchronization can begin and in block 310, within the synchronization client, a set of initial updates can be computed for transmission to the synchronization server. Concurrently, in block 360 in the synchronization server, a set of initial updates can be computed for transmission to the synchronization client. In both blocks 320 and 370, respective synchronization logs can be retrieved for processing so that the set of initial updates can be further modified. Thereafter, in blocks 330 and 380, the replica tables within each of the synchronization logs can be retrieved and exchanged between the synchronization client and the synchronization server.

In this regard, where the synchronization log is a peer synchronization log, the synchronization log can track each synchronized update from the synchronization server by unique identifier and a timestamp indicating when the update occurred. The synchronization log further can include a replica table tracking each replica with which the synchronization client has synchronized. The replica table can include a unique identifier for the replica within the peer and a timestamp of the last synchronization according to the peer. In consequence, the synchronization client can receive not only synchronization server applied updates, but also peer applied updates received in the synchronization server and passed to the synchronization client.

In block 340, within the synchronization client the initial set of updates can be pruned according to the synchronization log so that already applied updates in the synchronization server are excluded from the filtered set of updates. Additionally, updates already applied by other peers in the synchronization server as indicated by the replica table can be excised from the filtered set of updates. Correspondingly, in block 390, the replica filter can be applied to the initial set of updates in the synchronization server in order to remove from a filtered set of updates any updates already pushed to the synchronization client by other peers. Finally, in block 350 the synchronization client can forward the filtered set of updates to the synchronization server, while in block 400 the synchronization server can forward the filtered set of updates to the synchronization client.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. With specific reference to a computer readable storage medium, it is to be understood that a storage medium excludes transitory media such as transitory signals and other propagation media.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A data synchronization method comprising:
receiving in a synchronization data store of a receiving synchronization client both synchronization server applied updates and also peer applied updates received in the synchronization server from one or more peer synchronization clients and passed to the receiving synchronization client from the peer synchronization clients;

configuring a replica table within a synchronization log of the receiving synchronization client of updates excluded from past synchronizations to track a replica with which the receiving synchronization client has synchronized the synchronization data store, the replica table including entries that are separate from entries of the synchronization log, each entry of the replica table including a unique identifier for each replica stored therein and a time stamp of a last synchronization applied to synchronization data store of the receiving synchronization client by a corresponding one of the peer synchronization clients, the synchronization log in addition to the replica table further including a unique identifier for a synchronized update with a synchronization server and a second timestamp indicating when an update occurred with the synchronization server;

assembling a group of initial updates on the receiving synchronization client for synchronization with the synchronization server;

consulting the synchronization log of the receiving synchronization client to determine updates already applied to the synchronization data store of the receiving synchronization client by the synchronization server during past synchronizations and additionally consulting the replica table in the synchronization log of the receiving synchronization client to identify updates received in the receiving synchronization client from corresponding ones of the peer synchronization clients but that had not yet been applied to the synchronization data store of the receiving synchronization client since an immediate past synchronization;

removing from the initial updates, ones of the initial updates indicated by both the synchronization log and the replica table as already having been applied during past synchronizations to produce a filtered set of updates and excluding from the filtered set of updates ones of the initial updates received in the receiving synchronization client from corresponding ones of the peer synchronization clients that are reflected in the synchronization data store; and, forwarding the filtered set of updates to the synchronization server.

2. The method of claim 1, wherein assembling the group of initial updates for synchronization, comprises assembling a group of initial updates having the timestamp greater than a timestamp for the immediate past synchronization.

3. The method of claim 1, further comprising garbage collecting aged entries in the peer synchronization log.

4. A peer-to-peer synchronization data processing system comprising:
a synchronization server with at least one processor and memory configured for coupling to a plurality of synchronization clients configured for peer-to-peer synchronization, the synchronization server forwarding to different synchronization clients both synchronization server applied updates and also peer applied updates received in the synchronization server; and, synchronization log based synchronization logic executing in memory of the synchronization server comprising program code enabled to track within the synchronization server updates previously applied to a selected one of the plurality of synchronization clients, to determine updates already applied during past synchronizations by receiving a replica table from within a peer synchronization log of updates excluded from past synchronizations from the selected one of the plurality of synchronization clients and consulting the synchronization log of the synchronization client to determine updates already applied by the synchronization server during past synchronizations and additionally consulting the replica table to identify updates in the selected one of the plurality of synchronization client received from the selected one of the plurality of synchronization clients that had not been updated since an immediate past synchronization, the replica table including entries that are separate from entries of the synchronization log, each entry of the replica table including a unique identifier for each server update previously applied to a selected one of the plurality of synchronization clients and a time stamp of a last synchronization applied by the selected one of the plurality of synchronization clients, the peer synchronization log in addition to the replica table also including a unique identifier for a synchronized update with the synchronization server and a second timestamp indicating when an update occurred with the synchronization server, to remove from a filtered set of the updates any of the updates already applied during past synchronizations with the selected one of the plurality of the synchronization clients as indicated by both the synchronization log and the replica table, and to exclude from the filtered set of the updates ones of the updates received in the receiving synchronization client from corresponding ones of the peer synchronization clients that are reflected in the synchronization data store, and to forward the filtered set of the updates to the synchronization server.

5. The system of claim 4, wherein the program code of the synchronization log based synchronization logic further is enabled to exclude from synchronization updates in the selected one of the synchronization clients that had been received in the selected one of the synchronization clients from a peer that had not been synchronized in the synchronization server since an immediate past synchronization with the selected one of the synchronization clients.

6. The system of claim 4, further comprising a garbage collector configured to garbage collect aged entries in the synchronization log.

7. A computer program product comprising a computer readable storage medium storing computer usable program code thereon for data synchronization, the computer program product comprising:

computer usable program code for receiving in a synchronization data store of a receiving synchronization client both synchronization server applied updates and also peer applied updates received in the synchronization server from one or more peer synchronization clients and passed to the receiving synchronization client from the peer synchronization clients;

computer usable program code for configuring a replica table within a synchronization log of the receiving synchronization client of updates excluded from past synchronizations to track a replica with which the receiving synchronization client has synchronized the synchronization data store, the replica table including entries that are separate from entries of the synchronization log, each entry of the replica table including a unique identifier for each replica stored therein and a time stamp of a last synchronization applied to synchronization data store of the receiving synchronization client by a corresponding one of the peer synchronization clients, the synchronization log in addition to the replica table further including a unique identifier for a synchronized update with a synchronization server and a second timestamp indicating when an update occurred with the synchronization server;

computer usable program code for assembling a group of initial updates on the receiving synchronization client for synchronization with the synchronization server;

computer usable program code for consulting the synchronization log of the receiving synchronization client to determine updates already applied to the synchronization data store of the receiving synchronization client by the synchronization server during past synchronizations and additionally consulting the replica table in the synchronization log of the receiving synchronization client to identify updates received in the receiving synchronization client from corresponding ones of the peer synchronization clients but that had not yet been applied to the synchronization data store of the receiving synchronization client since an immediate past synchronization;

computer usable program code for removing from the initial updates, ones of the initial updates indicated by both the synchronization log and the replica table as already having been applied during past synchronizations to produce a filtered set of updates and excluding from the filtered set of updates ones of the initial updates received in the receiving synchronization client from corresponding ones of the peer synchronization clients that are reflected in the synchronization data store; and, computer usable program code for forwarding the filtered set of updates to the synchronization server.

8. The computer program product of claim 7, wherein the computer usable program code for assembling the group of initial updates for synchronization, comprises computer usable program code for assembling the group of initial updates having the timestamp greater than a timestamp for the immediate past synchronization.

9. The computer program product of claim 7, further comprising computer usable program code for garbage collecting aged entries in the peer synchronization log.

* * * * *